No. 886,991.
PATENTED MAY 5, 1908.
J. KRODER.
CURTAIN POLE.
APPLICATION FILED JULY 26, 1907.
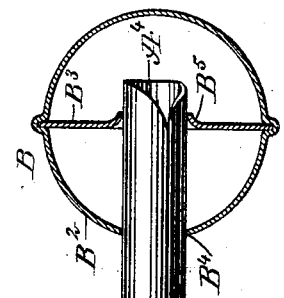
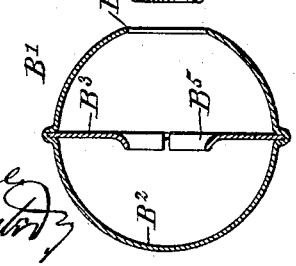
WITNESSES
Edw. Thorpe
Rev. G. Wood
INVENTOR
John Kroder
BY
Munn & Co.
ATTORNEYS.
THE NORRIS PETERS CO., WASHINGTON, D. C.

UNITED STATES PATENT OFFICE.

JOHN KRODER, OF NEW YORK, N. Y.

CURTAIN-POLE.

No. 886,991.  Specification of Letters Patent.  Patented May 5, 1908.

Application filed July 26, 1907. Serial No. 385,603.

*To all whom it may concern:*

Be it known that I, JOHN KRODER, a citizen of the United States, and a resident of the city of New York, borough of Manhattan, in the county and State of New York, have invented a new and Improved Curtain-Pole, of which the following is a full, clear, and exact description.

The invention relates to curtain poles such as shown and described in the Letters Patent of the United States, No. 761,508, granted to me on May 31, 1904.

The object of the present invention is to provide a new and improved curtain pole, arranged to permit of conveniently engaging the knob with the end of the tubular pole, and in the case of telescoping tubular poles to allow of readily engaging one pole section with the other.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1 is a longitudinal central section of the improvement, parts being shown in elevation, and Fig. 2 is a side elevation of a part of the split tubular pole.

In curtain poles, such, for instance, as shown and described in the Letters Patent of the United States above referred to, considerable difficulty is experienced in placing the knobs in position on the outer ends of the split tubular pole, owing to undue opening up of the split end of the tube and the squarely cut off terminal of the tube. In a like manner and for a like reason, it is difficult in sectional telescoping tubes to insert the squarely cut off end of the smaller section in the squarely cut off end of the larger section. In order to overcome this difficulty and to permit of readily and conveniently assembling the parts, the following arrangement is provided:

As illustrated in Fig. 1, the curtain pole comprises the tube A and the knobs B and B', of which the knob B is in position on one end of the tube A, and the other knob B' is shown removed from the other end of the tube A. Each of the knobs B and B' is preferably of the construction more fully shown and described in the Letters Patent of the United States above referred to, so that further detailed description of the same is not deemed necessary, it being sufficient to state that each knob B and B' consists of a shell $B^2$ and a split disk $B^3$ held within the shell $B^2$, the latter and the split disk $B^3$ having bearings $B^4$, $B^5$ for the reception of the corresponding end of the tube A, to clampingly hold the knobs B and B' in position on the tube A.

The tube A is made in telescoping sections $A'$, $A^2$, and each section is provided with a longitudinally extending split $A^3$ having its side walls beveled outwardly at each end of the tube section, so that the split gradually widens at each end of the tube section, thus producing a bevel $A^4$ at each end of the tube section. Now when placing a knob B or B' in position on the corresponding end of the tube A, it is evident that owing to the bevel $A^4$ the bearing $B^4$ or $B^5$ readily engages the end of the tube even if the latter has opened up in excess of the opening of the bearing $B^4$ or $B^5$, as the walls of the bearing in coming in contact with the corresponding end of the tube A draw the ends gradually together owing to the bevel $A^4$, so that the bearing readily passes onto the end of the tube. In a like manner when the section $A^2$ is to be inserted into the section $A'$ the bevels $A^4$ permit gradual closing of the ends of the sections, so as to allow the section $A^2$ to conveniently slip into the section $A'$.

As the tube A as well as the knobs B and B' is made of resilient material, it is evident that the beveled ends of the tube A firmly engage the bearings $B^4$, $B^5$, to securely hold the knobs in place by frictional contact of the parts referred to.

Having thus described my invention, I claim as new and desire to secure by Letters Patent:

1. A curtain pole comprising a plurality of split tubes, telescoping with each other, and knobs having openings for receiving the free ends of the tubes, the inner ends of the inner section and the outer ends of both sections being beveled, the bevel commencing at the split.

2. A curtain pole comprising a tube, and a knob for the end thereof, the knob having a hub for the reception of the end of the tube, the latter being made in telescoping sections, and each section being split in the direction of its length, the split widening at each end of a section.

In testimony whereof I have signed my name to this specification in the presence of two subscribing witnesses.

JOHN KRODER.

Witnesses:
   THEO. G. HOSTER,
   EVERARD B. MARSHALL.